April 6, 1943.　　　　J. W. DAWSON　　　　2,315,602

CONTROL APPARATUS

Original Filed May 7, 1938　　2 Sheets-Sheet 2

WITNESSES:
C. J. Weller.
John R. Shipman

INVENTOR
John W. Dawson.
BY
ATTORNEY

Patented Apr. 6, 1943

2,315,602

UNITED STATES PATENT OFFICE 2,315,602

CONTROL APPARATUS

John W. Dawson, Auburndale, Mass., assignor to Westinghouse Electric & Manufacturing Company, East Pittsburgh, Pa., a corporation of Pennsylvania Original application May 7, 1938, Serial No. 206,640. Divided and this application July 15, 1941, Serial No. 402,499

5 Claims. (Cl. 172—238)

My invention relates to control apparatus and has particular relation to apparatus for precisely varying the supply of power to a load.

The present application is a division of my application, Serial No. 206,640, filed May 7, 1938, and assigned to the Westinghous Electric & Manufacturing Company.

My invention has particular applicability to welding apparatus in which the welding current supplied must be varied over a wide range to accommodate the different properties of the materials to be welded. In resistance welding apparatus constructed and operated in accordance with the teachings of the prior art of which I am aware, current is supplied for welding purposes from an alternating-current source during selected half periods of the source. The time during which welding current is supplied is measured in terms of half-periods of the source. To vary the welding heat, the instant of initiation of the supply of current in each of the half periods of the source is varied. The selection of a number of half-periods for any welding operation shall be designated herein as the timing of the welding operation. The setting of the instants in the half-periods when current flow is initiated shall be designated herein as heat-control.

Timing and heat control in welding involves the use of valves which permit current flow to the welding load, at most, during a half period of the source. In the apparatus of the prior art, the flow of current through the valves is initiated by impressing initiating impulses on the valves. The welding is timed by supplying initiating impulses during a certain number of selected half-periods; the heat is controlled by setting the instant in each half period at which the corresponding initiating impulse becomes effective. The phase angle at which the initiating impulses become effective in the half cycles of the source is customarily determined by a phase shift network of the usual type. Such a network comprises a pair of dephasing impedances connected in series across a source and some means for, in effect, deriving the potential existing between any desired point on either of the impedances and an intermediate output tap of the source.

In apparatus constructed in accordance with the teachings of the prior art, a voltage divider is connected in parallel with the whole series impedance network and one of the output terminals of the phase shift system is the variable tap of the voltage divider. However, I have found that as the variable tap of the voltage divider is moved from point to point, the current supplied to the load does not vary uniformly with the setting of the tap. As a matter of fact, for considerable portions of the available path of movement of the tap, particularly at the two ends thereof, the change in the current flow produced is inappreciable for different settings of the tap. A relatively small portion of the voltage divider, therefore, actually serves a useful purpose.

It is accordingly, an object of my invention to provide a phase shift network wherein it shall be possible to select any desired portion of a half cycle for the range of control.

Another object of my invention is to provide a system incorporating a voltage divider for controlling the current flow from a source of periodic pulsations through a load by controlling the points of initiation of current flow during each of the pulsations, wherein the magnitude of the current shall be a substantially uniformly varying function of the distance of the putput of the variable tap of the voltage divider from its ends.

More generally stated, it is an object of my invention to provide a contrivance for controlling the initiation of current flow from a source of periodic pulsations to a load at different points in the pulsations, incorporating an impedance for attaining the desired control, wherein over the whole range of the impedance, the current supplied to the load shall be a substantially linear function of the setting of the impedance.

According to my invention, I connect the voltage divider whereby the current flow through the load is to be varied between connecting points of the phase shift impedance elements that are intermediate the ends thereof. The connecting points are so selected that the current flow through the load will vary as a substantially linear function of the setting of the voltage divider over the whole range of the voltage divider. The intermediate connecting point of one of the dephasing impedances to which the voltage divider is connected is selected to correspond to a value of load current of such small magnitude that it produces no appreciable effect on the load apparatus. The intermediate connecting point of the other dephasing impedance is such that with the voltage divider set at this point the current flow is initiated at instants in the pulsations of the source which correspond to substantially the maximum current which may flow through the load, taking into consideration its power factor. Since welding loads have power factors which vary over a relatively extensive range, the latter dephasing impedance is in accordance with another aspect of my invention provided with a number of intermediate connecting points, each of which corresponds to a different power factor.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which:

Figure 1:
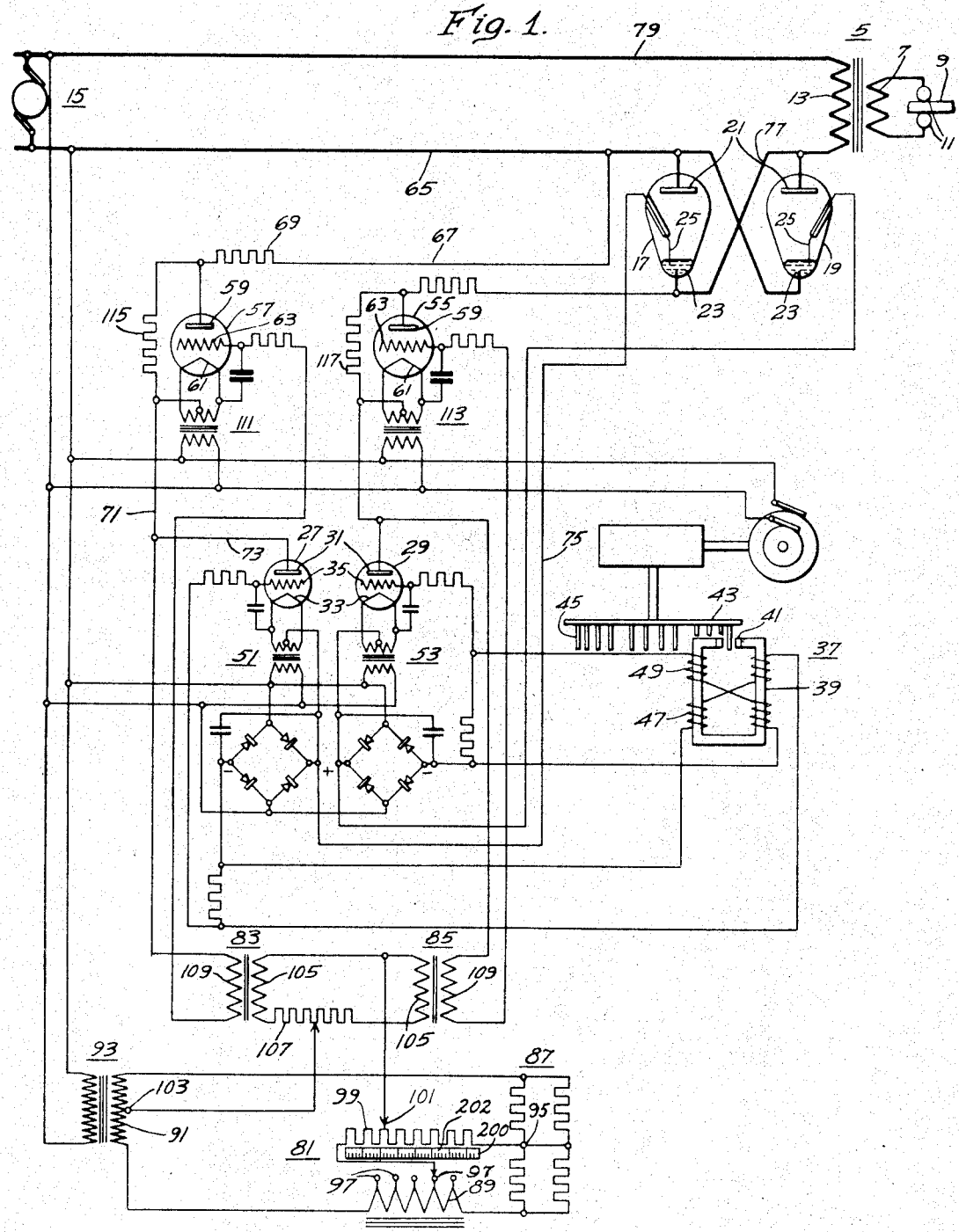
Figure 1 is a diagrammatic view showing a preferred embodiment of my invention.

The apparatus shown in Figure 1 comprises a welding transformer 5, from the secondary 7 of which current is supplied to weld a material 9 through a pair of suitable electrodes 11. The primary 13 of the welding transformer is supplied from a suitable source 15 through a pair of discharge paths 17 and 19 connected in antiparallel. Each of the paths comprises an anode 21, a mercury-pool cathode 23, and an ignition electrode 25 of boron-carbide or a similar material which dips into the mercury. Current is supplied to the welding transformer 5 through the discharge paths 17 and 19, each path carrying a current pulse during a half period.

The flow of current through the discharge paths is initiated at predetermined points in the half periods of the source by impressing impulses on the ignition electrode 25 of each path in its turn. When once initiated during any half period, the current continues to flow until a short time after the half period, the length of which is determined by the power factor of the load. The number of half periods during which current flow takes place is selected by the operation of a magnetic impulsing device described in detail in my Patent No. 2,081,987, for Electric control systems, issued June 1, 1937, and assigned to the Westinghouse Electric & Manufacturing Company.

Briefly, the selection takes place by supplying the ignition impulses for the discharge paths 17 and 19 through timing electric discharge devices 27 and 29. Each timing device has an anode 31, a cathode 33, a control electrode 35, and a gaseous medium. The timing devices 27 and 29 are rendered conductive during the selected half periods by impulses impressed between their respective control electrodes 35 and cathodes 33 from a magnetic impulsing device 37. The latter comprises a permanent magnet core 39 of rectangular form having an air gap 41 over which a disc 43 is rotated in synchronism with the source 15. In the periphery of the disc, pins 45 are inserted so that they pass through the air gap 41 during the selected half periods and induce potential impulses in coils 47 and 49 wound on the core. The coils 47 and 49 are connected in the control circuits 51 and 53, respectively, of the timing devices 27 and 29 in the usual well known manner.

A second pair of electric discharge devices 55 and 57, which I shall herein designate as heat control devices is provided to set the points in the half periods at which the main discharge paths are rendered conductive. Each of the heat control devices comprises an anode 59, a cathode 61, a control electrode 63 and a gaseous medium. A heat control device and a timing device are connected in series with an ignition electrode of each of the main discharge paths. For the path 17 this circuit extends from the lower supply conductor 65, through a conductor 67, a current limiting resistor 69, the anode 59 and the cathode 61 of the left-hand heat control device 57, a conductor 71, a conductor 73, the anode 31 and the cathode 33 of the left-hand timing device 27, a conductor 75, the ignition electrode 25 of the path 17, the cathode 23, a conductor 77 and the primary 13 of the upper supply conductor 79.

The heat control devices 57 and 59 are controlled from a phase shift network 81 through control transformers 83 and 85, respectively. The network comprises a parallel-connected resistor assembly 87 connected in series with a reactor 89 across the secondary 91 of an auxiliary transformer 93. In lieu of the resistors 87 and the inductive reactor 89 actually used, dephasing impedances of other types may be utilized. Thus for example, the reactor may be replaced by a capacitor.

The resistor assembly 87 is provided with an intermediate connecting point 95 and the reactor is provided with a plurality of such intermediate points 97. A voltage divider 99 is connected between the intermediate connecting point 95 of the resistors 87 and one of the points 97 of the reactor 89. The potential output between the variable tap 101 of the voltage divider 99 and an intermediate tap 103 of the secondary 91 of the auxiliary transformer 93 is supplied to the primaries 105 of the control transformers 83 and 85. The variable tap 101 is connected to the common junction point of one of the terminals of each of the primaries 105 and the intermediate tap 103 is connected to a point on a balancing resistor 107 that is connected between the other terminals of the primaries.

The settings of the variable tap 101 of the voltage divider 99 correspond to different phases of the potential impressed on the secondaries 109 of the control transformers 83 and 85. Over the whole voltage divider the phase of the potential impressed varies from an angle corresponding to the intermediate connecting point 95 of the resistors 87 to an angle corresponding to the selected intermediate connecting point 97 of the reactor 89. The secondaries 109 of the transformers 83 and 85 are connected between the control electrodes 59 and the cathodes 61 of the heat control devices 57 and 59, respectively, and the potential of these secondaries is, therefore, impressed in the corresponding control circuits 111 and 113.

The potentials thus impressed in the control circuits of the heat control devices 57 and 59 from the phase shift network have the effect of rendering the heat control devices conductive at points in the half cycles corresponding to the settings of the voltage divider 99. The pins 45 moving through the air gap in the core 39 impress potentials to render the timing devices 27 and 29 conductive during the selected half periods. The timing devices 27 and 29, however, are rendered conductive at points in the half periods that are earlier than the earliest points at which the heat control devices 57 and 59 are rendered conductive. Accordingly, resistors 115 and 117 are connected to shunt the heat control devices 57 and 59, respectively, thus affording paths for the current from the timing devices to flow when they are conductive, while the heat control devices are still non-conductive. The resistors 115 and 117 are, of course, of such magnitude that the main paths 17 and 19 are not rendered conductive by the current which flows through the resistors and the ignition electrodes 25.

When the heat control devices 57 and 59 are rendered conductive at the selected instants in the half periods, substantial current flows through the associated ignition electrodes 25 and the corresponding main discharge paths 17 and 19, respectively, are rendered conductive. Welding current is thus conducted for a number of half periods predetermined by the arrangement of the pins 45 in disc 43 and during portions of the half periods predetermined by the setting of the voltage divider 99. By varying the setting of the variable tap 101 of the voltage divider 99, the points in the half periods at which the discharge paths 17 and 19 are rendered conductive may be varied and the supply of welding current correspondingly varied. The current decreases as the tap 101 is moved from left to right and the welding current is, therefore, a function of the setting of the tap. In accordance with my invention, the intermediate connecting points 95 and 97 of the resistors 87 and the reactor 89, respectively, are so selected that the welding current is a substantially linear function of the setting of the variable tap 101 over the whole range of the voltage divider 99. It is to be noted, however, that while linearity is, in general, the condition desired, there are cases in which the welding current may be other than a linear function of the setting of the tap 101. My invention includes such cases within its scope when the selection of the connecting points 95 and 97 is such that over the whole range of the voltage divider 99 there is a substantial increase in current for each successive operation.

In selecting the intermediate connecting points 95 and 97, the properties of the apparatus must be taken into consideration. The intermediate connecting point 95 of the resistors 87 is selected so that if the variable tap 101 of the voltage divider 99 coincides electrically with it, the current transmitted through the load 9 will be too small to produce any appreciable welding effect. The intermediate connecting points 97 of the reactor 89 are selected to correspond to the maximum possible current flow for the particular load that is being supplied. The maximum current is that which flows when the discharge paths 17 and 19 are rendered conductive at angles in the half cycles, which correspond to the power factor angle of the load. The intermediate connecting points 97 of the reactor, therefore, correspond to the different power factors which different loads would have.

Figure 2:
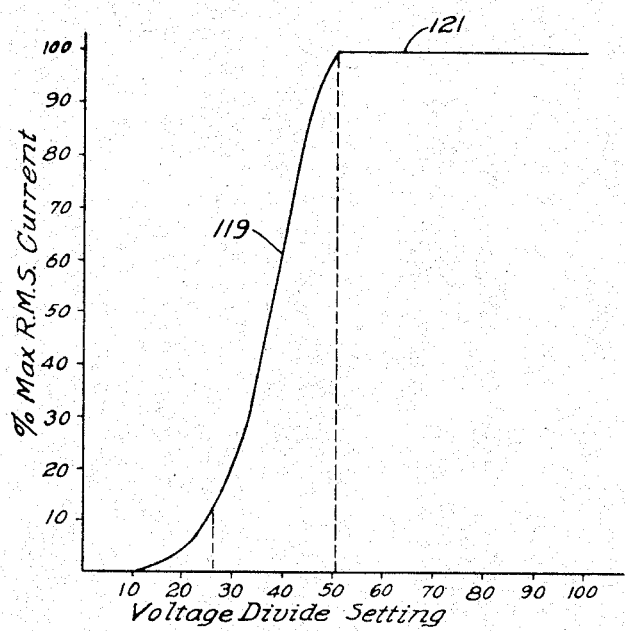
Fig. 2 is a graph showing the relationship between the settings of the voltage divider and the load current in the prior art apparatus.
Figure 3:
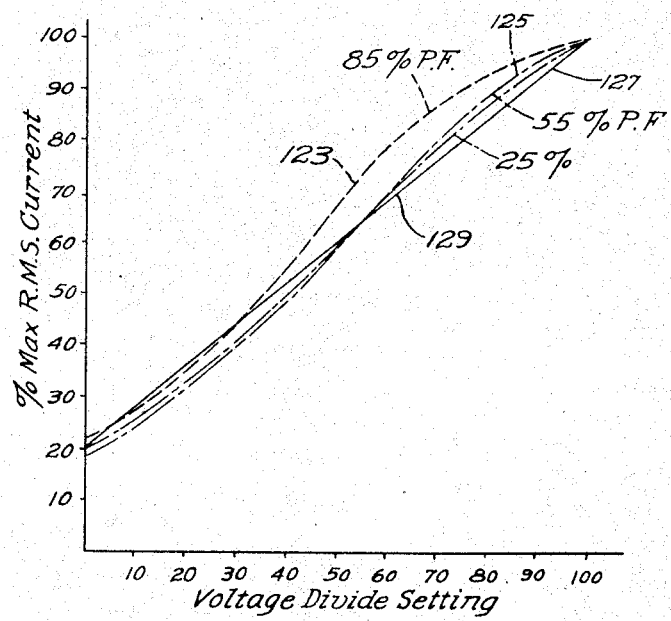
Fig. 3 is a graph showing the relationship between the load current and the settings of the voltage divider in apparatus constructed according to my invention.

The advantageous aspects of the invention are illustrated in Figs. 2 and 3. In Fig. 2 the percent of maximum current is plotted as a function of the setting of the voltage divider for the prior art apparatus. It will be noted that the useful range of the voltage divider, constituting the straight line portion 119 of the curve 121 which extends approximately from the setting 26 to the setting 46 constitutes a relatively small portion of the whole voltage divider. For a given length of voltage divider, therefore, a considerable portion is not used for any purpose and goes to waste. Fig. 3 is a corresponding plot for a system in accordance with my invention. The different curves 123, 125 and 127 correspond to different power factors as indicated. For purposes of comparison, a straight line 129 passing through points in the neighborhood of those corresponding to the curves 123, 125 and 127 is also plotted. By comparing the curves with the line, it will be seen that in an arrangement in accordance with my invention, the current flow is a substantially linear function of the setting. It will be noted that in an arrangement corresponding to Fig. 3, substantially the whole range of the voltage divider is used.

Figure 4:
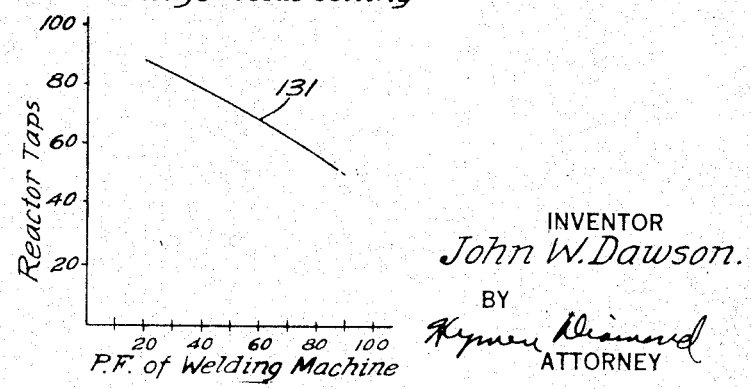
Fig. 4 is a graph showing the relationship between the power factor and the settings of one of the dephasing impedances.

In the operation of my invention the power factor of the load 9 may be determined by any test well known in the art, as for example, by using a power factor meter. The left-hand end of the voltage divider 99 is then connected to a point 97 of the reactor 89 which corresponds to the power factor in question. The tap required may be derived from a curve 131 such as is shown in Fig. 4, in which the percent of the length of the reactor 89 is plotted as a function of the power factor.

With the voltage divider 99 connected as described above, its variable tap 101 may be set at a point along it corresponding to the desired current flow with considerable accuracy, since the whole range of the divider is available for the setting.

The voltage divider 99 is customarily provided with a scale 200 preferably having uniformly spaced indications 202. By reading the scale the operator can at once note what percent of the maximum current will flow through the material for the corresponding setting of the voltage divider. In apparatus constructed according to the teachings of the prior art, the indications of the scale may be set to yield this information with any accuracy at all for a load of only one selected power factor. For different power factors than the one selected to correspond to the scale there is a material difference between the percent of maximum current to which the readings of the scale should correspond and those to which they actually do correspond. By providing the different connecting points 97 on the reactor 89 to correspond to different power factors, I eliminate this difference. With the voltage divider 99 connected to the point 97 that corresponds to the power factor of the load actually in use the scale divisions indicate accurately the percent of the maximum current which is flowing for the load.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A phase shift network comprising a source of electric power having a plurality of taps, a pair of dephasing impedances connected in series between a pair of the taps of said source, each of said impedances having an intermediate connecting point, a voltage divider having an adjustable tap connected between said points and means for deriving a potential between the adjustable tap of said divider and one of the taps of said source.

2. A phase shift network comprising a source of electric power having a plurality of taps, a pair of dephasing impedances connected in series between a pair of the taps of said source, each of said impedances having an intermediate connecting point, a voltage divider having an adjustable tap connected between said points, and means for deriving a potential between the adjustable tap of said divider and a tap of said source other than the pair to which said impedances are connected.

3. A phase shift network comprising a source of alternating current having a plurality of taps, a pair of dephasing impedances connected in series between a pair of the taps of said source, each of said impedances having an intermediate connecting point, a voltage divider having an adjustable tap connected between said points, and means for deriving a potential between the adjustable tap of said divider and one of the taps of said source.

4. A phase shift network comprising a source of electric power having a plurality of end taps and an intermediate tap, a pair of dephasing impedances connected in series between said end taps, each of said impedances having an intermediate connecting point, a voltage divider having an adjustable tap connected between said points, and means for deriving a potential between the adjustable tap of said divider and said intermediate tap of said source.

5. A phase shift network comprising a source of electric power having a plurality of taps, ohmic resistance means and reactance means connected in series between a pair of the taps of said source, said resistance means and said reactance means each having an intermediate connecting point, a voltage divider having an adjustaable tap connected between said points, and means for deriving a potential between the adjustable tap of said divider and one of the taps of said source.

JOHN W. DAWSON.